W. M. THOMAS.
METHOD OF AND APPARATUS FOR PHOTOGRAPHIC EXPOSURES AND PROJECTION.
APPLICATION FILED DEC. 17, 1915.
1,313,615.
Patented Aug. 19, 1919.
5 SHEETS—SHEET 4.
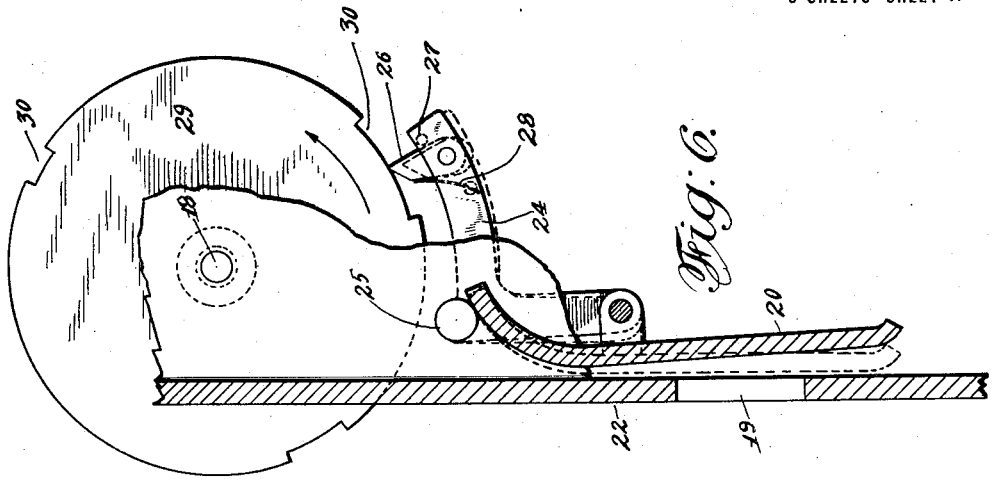
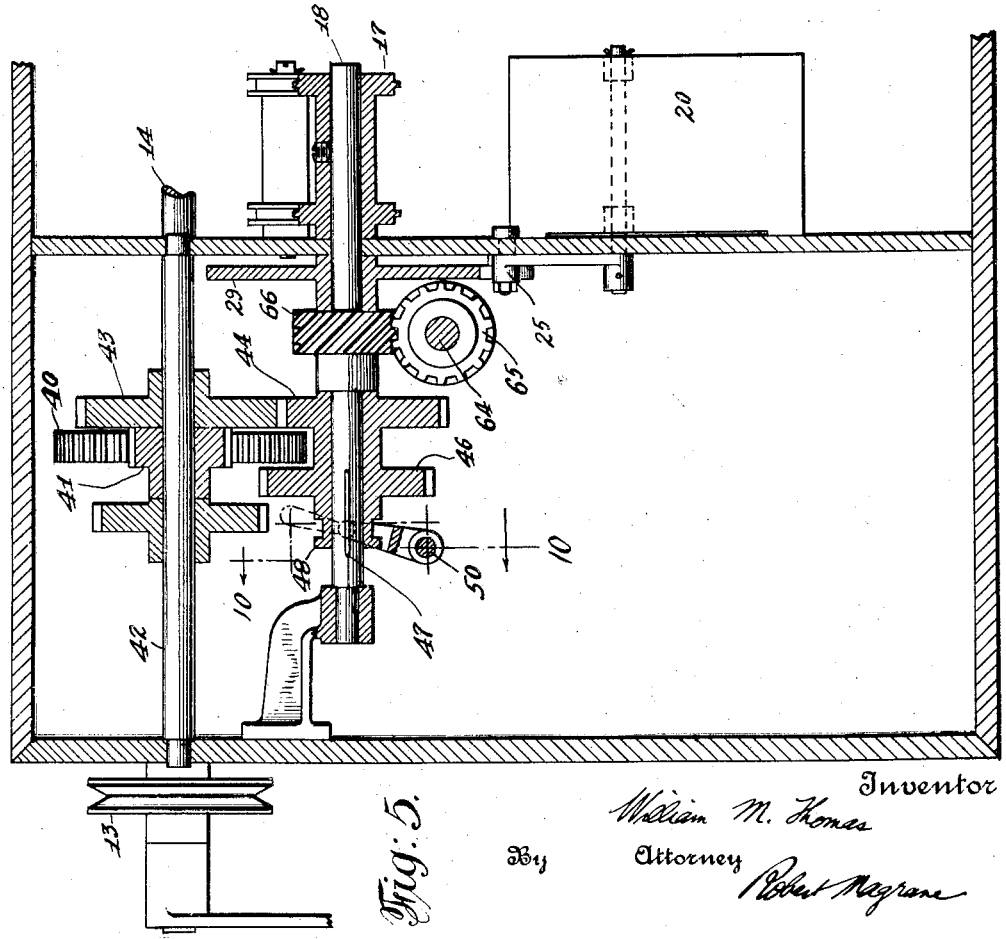

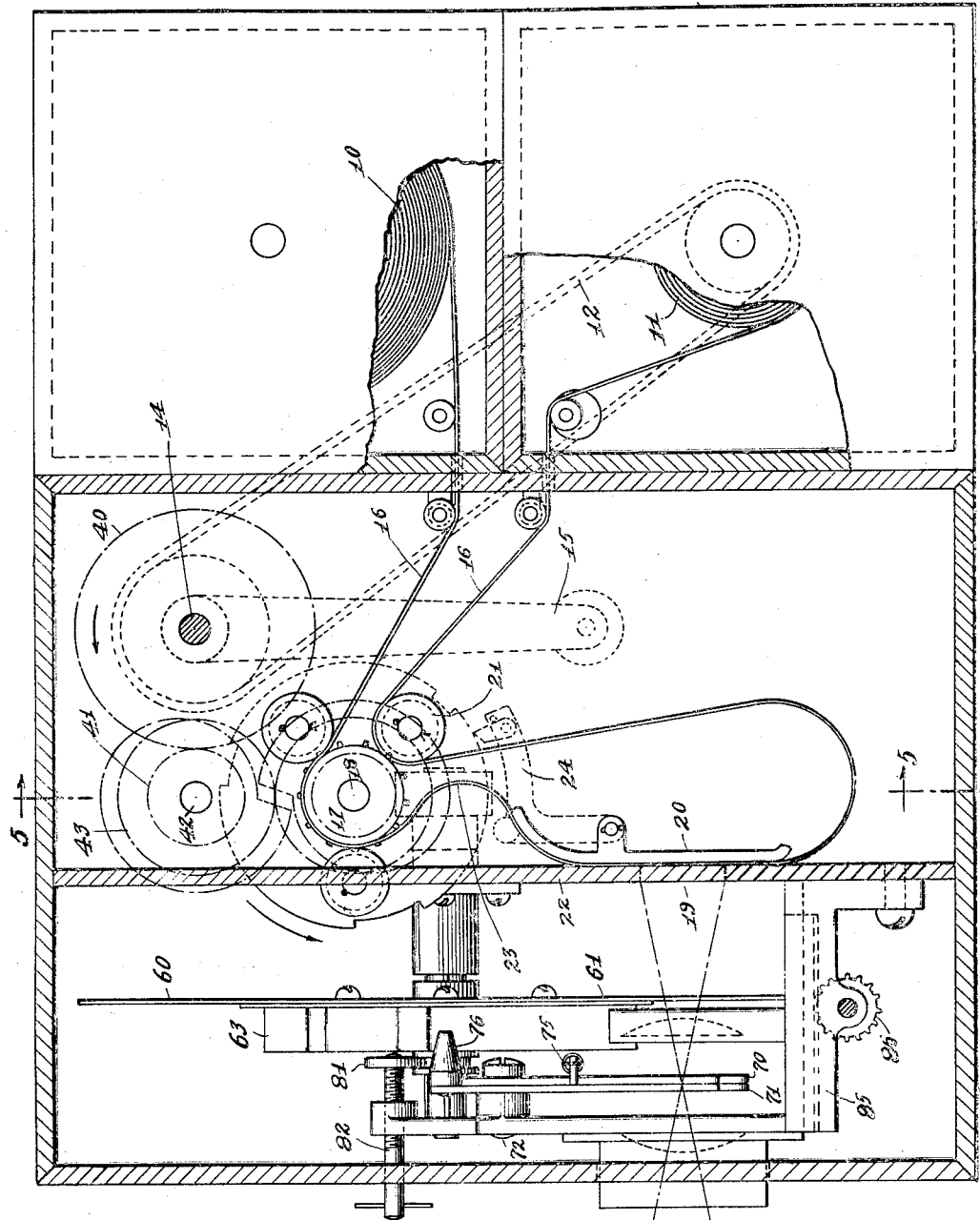

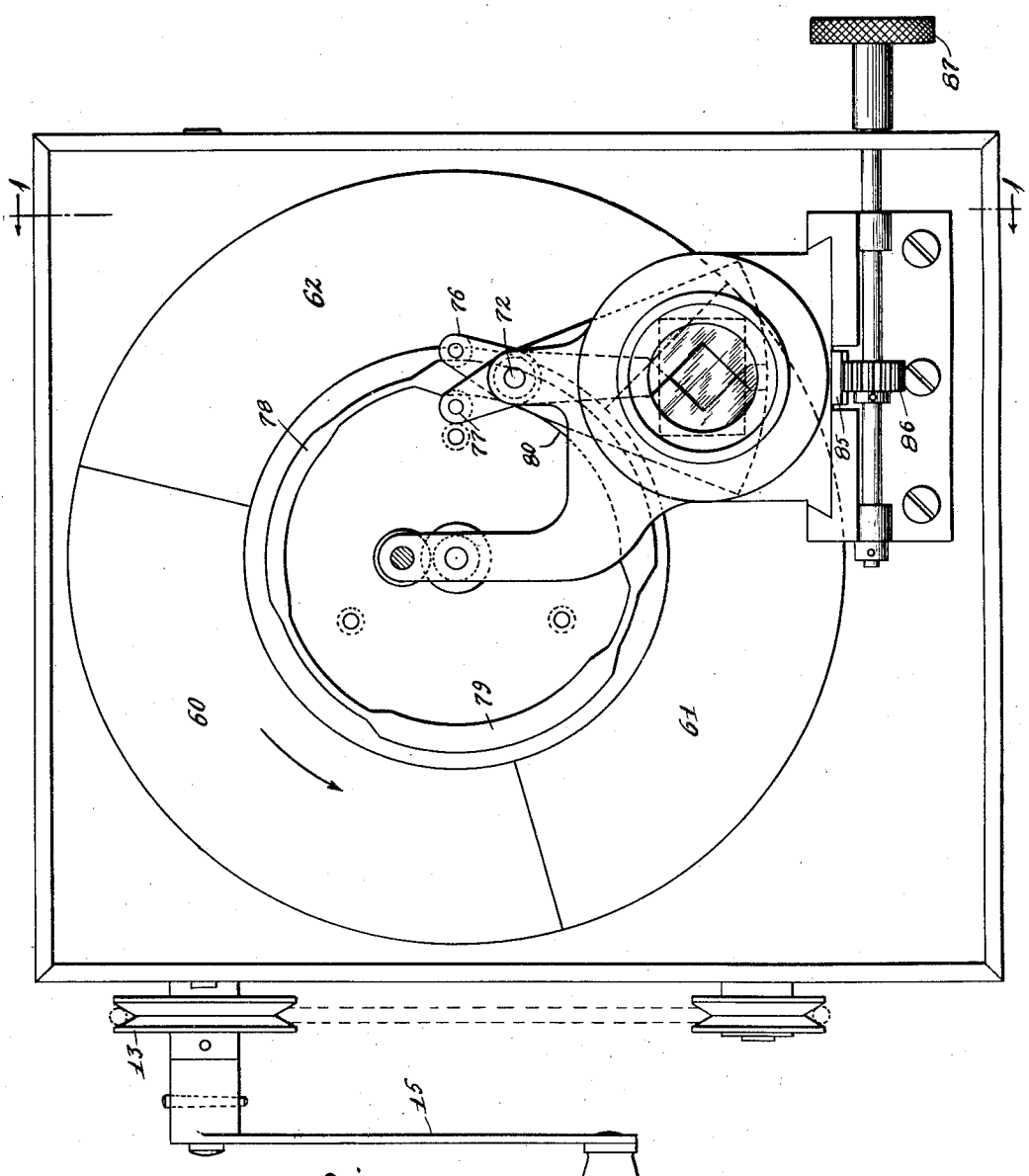

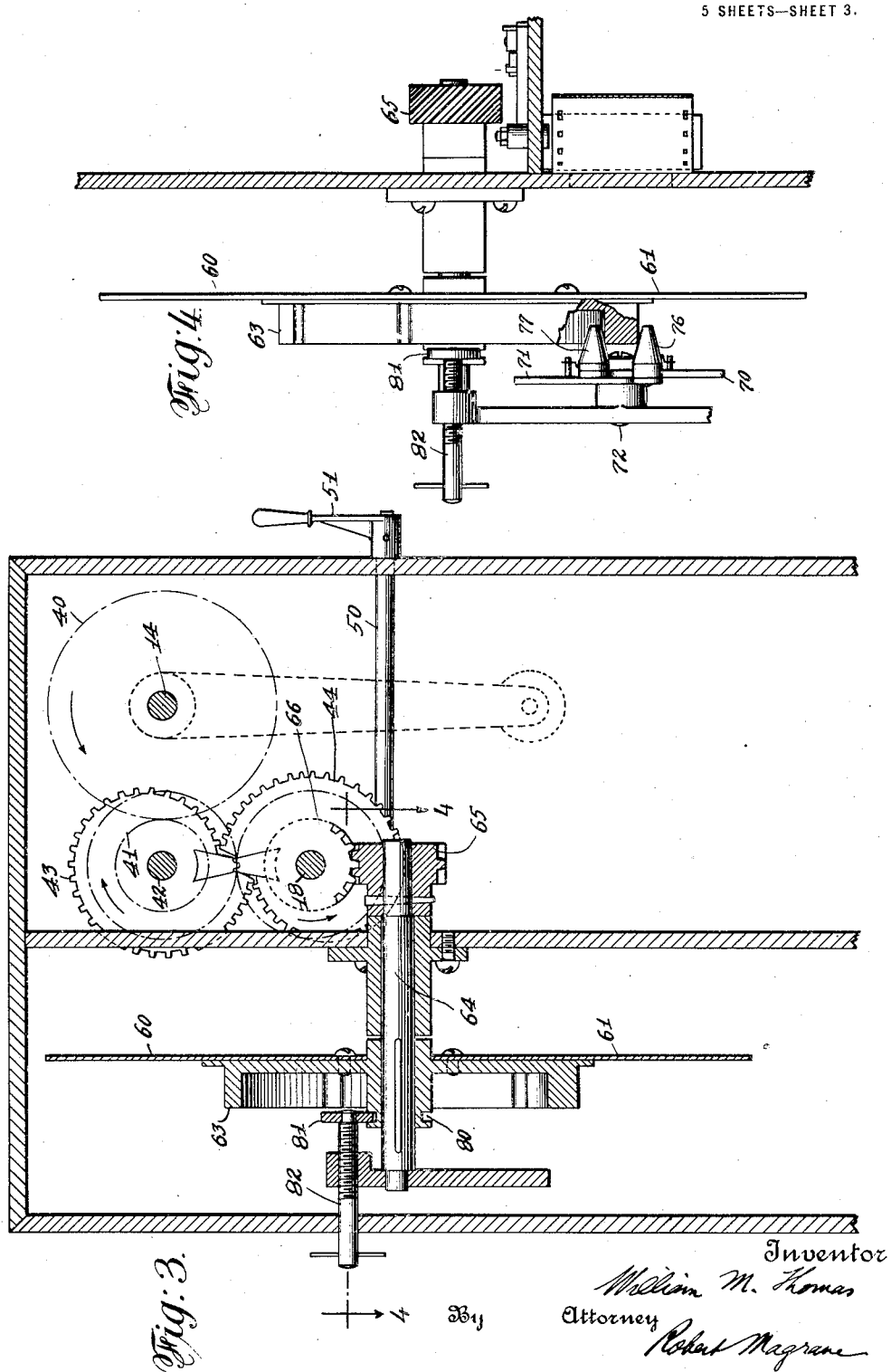

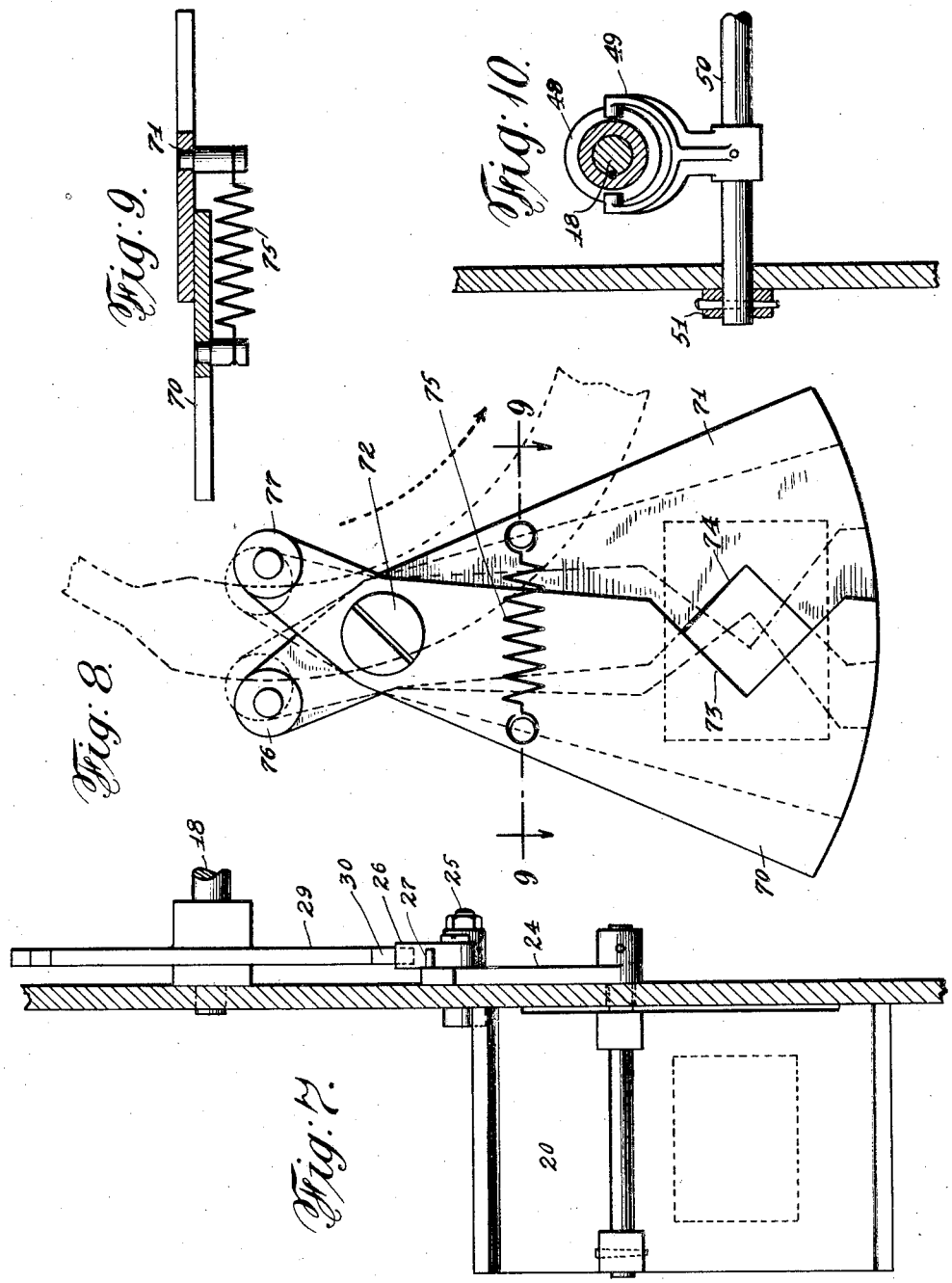

UNITED STATES PATENT OFFICE.

WILLIAM M. THOMAS, OF NEW YORK, N. Y., ASSIGNOR, BY MESNE ASSIGNMENTS, TO THOMAS-OBERKIRCH COMPANY, LIMITED, OF NEW YORK, N. Y., A CORPORATION OF NEW YORK.

METHOD OF AND APPARATUS FOR PHOTOGRAPHIC EXPOSURES AND PROJECTION.

1,313,615.   Specification of Letters Patent.   Patented Aug. 19, 1919.

Application filed December 17, 1915. Serial No. 67,332.

*To all whom it may concern:*

Be it known that I, WILLIAM M. THOMAS, a citizen of the United States, residing at New York, in the county and State of New York, have invented new and useful Improvements in Methods of and Apparatus for Photographic Exposures and Projection, of which the following is a specification.

This invention relates to methods and apparatus for the photography and projection of motion pictures with especial reference to the taking of pictures and their projection in color.

The objects of the invention include the development of a method of securing truer color values, a method of photography that increases the range and adaptability of color photography in motion pictures; that makes unnecessary the use of expensive panchromatic film; other objects are to provide apparatus adapted to make more correct exposures in color screen work; to provide means for moving the film at the extreme high rates of speed necessary in color work; such means to be simple to operate and free from vibration; to provide means for increasing the exposure time as compared with the shutter time; and still other objects will appear in the following description and the appended claims.

Referring to the drawings:

Figure 1 is a side elevation, partly in section, of the camera, showing my improved mechanism;

Fig. 2 is a front elevation of the same;

Fig. 3 is a sectional side elevation taken through the center of the camera;

Fig. 4 is a sectional detail of the shutter movement taken on the line 4—4 of Fig. 3;

Fig. 5 is a sectional elevation taken on the line 5—5 of Fig. 1;

Fig. 6 is a detail view of the film feeding mechanism;

Fig. 7 is another detail view of this section;

Fig. 8 is a view of the shutter and diaphragm stops in rear elevation;

Fig. 9 is a detail section taken on line 9—9 of Fig. 8; and

Fig. 10 is a sectional detail taken on the line 10—10 of Fig. 5.

There are many obstacles to the best motion picture color work as it is carried on under the present methods; whether the two-color or the three-color system be used there is great difficulty in getting sufficient lighting, either for exposures or projection. It is also difficult to get true color values, and it is further impossible to secure pictures with the sharpness and detail usually secured in black and white. In the apparatus used there is considerable vibration present and the wear upon the film is very great. The film itself when used for cameras has to be specially prepared, and its cost is about double that of ordinary film. These defects are inherent in the present method of taking colored pictures and in the photographic apparatus in use up to the present time. As is well known, ordinary exposures and projection of black and white pictures are made at a rate of about 16 pictures per second, this being the minimum number to avoid flickering of the picture when projected in black and white. When a color process is used a color flicker results, due to the successive shifting upon the screen of the primary colors used, and it has been found in practice that pictures projected in successive primary colors must have their rate of projection so determined that complete groups of the primary colors must be thrown upon the screen at the rate of 16 groups per second. In other words, to eliminate color flicker in two-color projection, the pictures must be projected at the rate of 32 per second, and in the case of three-color projections the pictures must be projected at the rate of 48 per second. The photographic and mechanical difficulties of taking and projecting pictures successfully at the rate of 48 per second are so great, that up to this time the three-color process has not been successfully used in the projection of colors in apparatus where the colors are presented successively through the same lens. Up to the present time it has been impossible to take satisfactory films in the three-color process. The time necessary to move the film in the camera of today is equal to about 50% of the total time that is available for the taking of each picture. In the case of three-color work, where the film moves at the rate of 48 pictures a second, the actual exposure time for any one picture would be about 50% of 1/48 of one second, which is represented in actual time by 1/96 of one second. While this exposure time might be sufficient for pictures taken under the violet screen, it is not enough for those taken under the red. Using the largest stop permissible with the lens will still not give sufficient light for proper exposure through the red filter, and with such a stop there is a great loss of detail in all of the pictures. At the present time, films are specially sensitized just prior to their use in cameras for motion color work.

In my improved method and with apparatus adapted to carry out such method, these difficulties are overcome. Instead of exposing each picture for the same period of time, the improved method and apparatus provides for a longer period of exposure of the picture under the red filter than under others. In other words, the time of exposure for each picture varies with the actinic value of the color screen through which the individual picture is taken. In addition to this, the diagram of the lens controlling the amount of light admitted to the film is made variable with each successive picture, so that the opening of the diaphragm also varies in proportion to the actinic value of the screen.

The mechanism for feeding the film intermittently at a velocity that makes this process possible is best shown in Figs. 1 and 6.

The film supply roll is indicated at 10 in Fig. 1, and the take-up reel at 11. The reel 11 is operated by a friction belt 12, connecting with a pulley 13 upon the operating shaft 14 of the machine, this shaft 14 carrying the crank 15 by means of which the mechanism is operated. The film 16 runs over the feeding sprocket 17, mounted upon shaft 18, both driven in the direction of the arrow shown in Fig. 1 by suitable gears from the operating shaft 14. The film passes over the sprocket and extends downward past the light aperture 19 and a clamping plate 20, forming the gate for the film. It is then carried back to the sprocket wheel 17, over an idle roll 21, and passes to the take-up reel. During the moment of exposure the film is clamped between the plate 20 and the part of the frame indicated at 22, and while it is thus held the sprocket wheel 17 continues to rotate, so that the film is bent in the form of a loop, as indicated at 23. The movement of the sprocket, while continuous, is so timed that during the period while the film is clamped, a loop 23 is formed of such size and under such a compressive stress that when the clamping plate 20 is withdrawn, the film springs downward, the total downward movement being equal to the unit distance. The plate 20 is swiveled to a bell crank 24, pivoted to the frame at 25. The bell crank carries a pawl 26 suitably held by a pin 27 and spring 28 in operative contact with the periphery of a notched disk 29 mounted upon shaft 18 and rotating in unison with the sprocket wheel 17. When one of the notches 30 of the disk 29 comes opposite the pawl 26, as best shown in Fig. 6, the bell crank arm moves upward slightly and operates to release the grip upon the film. This movement is a very slight one, and the plate 20 is small and light. The elasticity of the film is sufficient to cause the plate 20 to spring backward when it is permitted to do so by the notches in the disk 29.

This movement of the film is very rapid; tests indicating that the speed of movement from picture to picture is about 1/300 of a second.

The mechanism for varying the time of exposure for each picture in accordance with the related color screen is shown in Figs. 1, 3 and 5. Upon operating shaft 14 is mounted a gear 40, which meshes with a gear 41 mounted upon intermediate shaft 42. The ratio of these gears is preferably 2½ to 1. Keyed to shaft 42 and to shaft 18 are a pair of scroll gears 43 and 44. This pair of gears has a scroll pitch line which gives velocity ratios of 3 to 2, 2 to 2, 2 to 3, for each successive 120° of angular movement. It is through this gearing that the shaft 18, feeding sprocket 17 and disk 29 are driven. The diameter of the feed sprocket 17 is approximately the same as the unit distance through which the film is fed, so that the film is moved forward the unit distance for each third of a rotation of the feeding sprocket. As the clamp 20 is controlled by the notches 30 in the disk 29, it will be seen that the clamp 20 is operated at unequal intervals of time owing to the variable speed of the disk. The amount of exposure for three successive pictures taken under red, green and violet filters will be respectively as 9 to 6 to 4, the picture under the red filter getting the longest exposure, that under the violet the shortest.

To change this method of driving back to the ordinary form, so that the pictures will be given equal exposure times in order to take ordinary black and white, a change gear mechanism is included, as shown in Figs. 3 and 5. Scroll gear 44 and a circular spur gear 46 are mounted together to slide longitudinally upon shaft 18. The two gears are splined to the shaft 18 by a feather connection indicated at 47 and are further provided with a collar 48, equipped with a notch which is engaged by a yoke 49, as shown in Fig. 10. The yoke 49 is pinned to a shaft 50 mounted in the frame and having one end projecting therefrom and terminating in a handle 51 by which the shaft may be rocked. The rocking of the shaft 50 anti-clockwise, as viewed in Fig. 5, operates to disengage the scroll gears and to throw gear 46 into mesh with a similar gear 52 mounted upon shaft 42. In this position the variable speed device is cut out, a uniform speed drive substituted, and the film will be exposed at the light aperture for equal successive intervals of time.

The color screens are best shown in Figs. 2 and 3 and are indicated at 60, 61 and 62 in Fig. 2, each screen being in the form of a segment including an angle of 120 degrees. The three screens of any suitable material are mounted upon a cam plate or ring 63, which is splined to a shaft 64 upon which it is longitudinally movable. Shaft 64 is driven by the spiral gears 65, 66 from shaft 18.

The shutter mechanism and the means for varying the amount of light passing through the lens in accordance with the actinic value of the screen in register with the lens is best shown in Figs. 1, 2, 3, 4, 8 and 9. In this particular embodiment of my invention, the shutter and diaphragm stops for the lens are combined in the one mechanism and consist primarily, as shown in Fig. 8, of two leaves 70, 71 which have a common pivot 72 and are provided with notches 73 and 74, forming the aperture for the lens and positioned in its optical center. These leaves are normally drawn together by a spring 75 so that the light is completely cut off from the lens. The upper part of the leaves carry two cone-shaped extensions 76, 77 which are adapted to be engaged simultaneously by any one of the cams 78, 79 and 80 formed upon the cam ring 63. As best shown in Fig. 2, these cams are of varying width and operate upon the extension of the shutter leaves to spread them apart so that a diaphragm aperture is formed by the notches 73 and 74, the cross-sectional area of which depends directly upon the width of the cams. The cams are so related to the color screens that the diaphragm opening is greatest when the red screen is in registration with the lens and has its smallest cross-sectional area when the violet screen is in register.

At the time of passing from one color screen to the next, which is also the instant during which the film is shifted, the leaves are completely closed, forming a light-tight shutter for the lens.

The values of the diaphragm openings may be altered as desired for changes in light by suitable adjustment of the following mechanism. As shown in Figs. 1 and 3, the hub of the cam ring 63 is provided with a notch 80 which is engaged by the circular head 81 mounted upon the end of an adjusting screw 82 which extends to the outside of the casing. The turning of screw 82 slides the cam ring longitudinally along shaft 64 and the cams are brought to bear upon different sections of the cones 76 and 77 so as to vary the amount of movement given by the cams to the diaphragm leaves.

As shown in the same figures, the lens is provided with the usual focusing attachment consisting of a rack 85 and pinion 86 controlled by a suitable thumb nut 87 on the exerior of the camera.

In the particular illustration of the invention shown, the scroll gears give a series of successive driving ratios of 3 to 2, 2 to 2, and 2 to 3, as described above. These ratios of course may be varied to any desired extent. In the present case, and with the mechanism shown, there is a large increase in the time of exposure of the film under the red screen, due to the method of feeding the film by the loop and the use of the varying speed drive. In this mechanism the film movement and shutter movement are so rapid that the exposure for each picture under the same conditions as obtain in other cameras would be about 1/54 of one second, rather than 1/96 of one second. The total time exposure for taking three successive pictures under their respective color screens would be about 3/54 of a second, but as the exposure time for each of these pictures varies in accordance with the varying ratio of the driving gear, the actual time of exposure for the red, green and violet respectively is approximately 1/45, 1/54 and 1/68 of one second.

It will be seen with this arrangement that the exposure under the red screen is more than twice as long as in the case where an ordinary camera and mechanism are used. It will also be noticed that the film exposed under the violet screen has an actual exposure of about 1/68 of a second, and although this is the shortest exposure relatively to the other colors in this machine, it is still more prolonged than is the exposure of 1/96 of a second in the ordinary type of camera.

With the mechanism shown for altering the diaphragm opening automatically for each color screen and the possibility of establishing any desired ratio of openings in the diaphragm with respect to the color screen, it is possible, if the green and violet pictures do not need the relatively longer exposure which they may get by my improved mechanism, to adjust the diaphragm openings for these colors so that the lens is stopped down when those screens are in operative position. This permissible stopping down of the lens for the green and violet screens results in pictures of much greater sharpness and detail. For this reason the diaphragm opening for the red screen may be increased to allow more light to pass through the lens when the red screen is used, the loss of detail thus occasioned being corrected by the improved detail acquired in the green and violet pictures. With this additional light for the red screen exposures, and the dwell on the film during the red exposure, it is possible to take color pictures for the first time under ordinary conditions, and in addition to obtaining more correct color values, there is less loss of detail in the pictures when projected.

While my improved method and apparatus is shown in connection with the use of three color screens, it is obvious that it is equally applicable to other color systems, and I therefore do not limit myself to the particular arrangements shown and described.

I claim:

1. An apparatus for taking motion pictures in color including a lens, means to move a light sensitive film, a plurality of color screens adapted to filter the light successively, a diaphragm for the lens and means for regulating the opening of the diaphragm in accordance with the actinic effect of the color screens successively in register with the lens.

2. An apparatus for taking motion pictures in color including a lens, a plurality of color screens adapted to filter the light successively, a diaphragm for the lens and means for regulating the opening of the diaphragm in accordance with the actinic effect of the color screens successively in register with the lens, means for feeding the film intermittently and for regulating the exposure time of each picture respectively in accordance with the actinic effect of the color screen related thereto.

3. An apparatus for taking motion pictures in color including a lens, a diaphragm for the lens, a plurality of color screens adapted to filter the light successively, means for feeding the film intermittently and means for regulating the opening of the diaphragm and the exposure time of each picture in accordance with the actinic effect of the color screen in operative position.

4. An apparatus for taking motion pictures in color including a lens, a film feeding mechanism, a plurality of color screens adapted to filter the light successively, mechanism to control the amount of light passing through the lens, automatic means to regulate said mechanism in accordance with the actinic effect of the color screens successively in register with the lens, and adjustment devices for changing the effectiveness of said means.

5. An apparatus for taking motion pictures in color including a lens, a plurality of color screens adapted to filter the light successively, and a combined shutter and diaphragm adapted to shut off the light passing through the lens during the shifting of the film and to regulate the amount of light at other times in accordance with the actinic effect of the color screens successively in register with the lens.

6. The method of taking pictures for production of motion pictures in natural colors, which method comprises intermittently feeding picture strip film by moving the film continuously and positively in a forward direction and creating therein a stress sufficient to advance the film and intermittently offering and withdrawing a resistance to the forward movement of the film, then regulating the movement of the film past the light aperture in such manner that the time of exposure for each picture varies inversely with the actinic value of the screen used for said picture.

7. The method of taking motion pictures for projection in color which consists in exposing the film under successive color filters; varying the cross-sectional area of the pencil of light admitted through the lens in accordance with the respective color filters; and varying the period of exposure in accordance with the said respective color filters.

8. An apparatus for taking moving pictures in color comprising a lens and means to intermittently move a film picture-length intervals, a plurality of color screens adapted to filter the light successively, whereby each picture-length interval is exposed to one color screen, a movable diaphragm for controlling the pencil of light through said lens, means for regulating the opening of said diaphragm in accordance with the actinic effect of the color screens successively in register with the lens, and devices for adjusting said means to control the degree of regulation.

9. An apparatus for taking motion pictures in color comprising a lens, a plurality of color screens adapted to be brought successively into register with said lens to filter the light, a movable diaphragm for said lens, means for operating said diaphragm to proportion the opening of the said diaphragm in accordance with the actinic effect of the color screens, means for adjusting the effective operation of said diaphragm while said apparatus is in operation. and means for feeding the film intermittently and for regulating the exposure time of each picture respectively in accordance with the actinic effect of the color screen related thereto.

WILLIAM M. THOMAS.